United States Patent [19]

Cole

[11] Patent Number: 5,622,761
[45] Date of Patent: Apr. 22, 1997

[54] DOUBLE-SIDED RELEASEABLE ADHESIVE TAPE OR NOTE

[76] Inventor: Roger J. Cole, 12759 Via Felino, Del Mar, Calif. 92014

[21] Appl. No.: 394,772

[22] Filed: Feb. 27, 1995

[51] Int. Cl.$^6$ .................................................. C09J 7/02
[52] U.S. Cl. .................. 428/41.9; 428/42.1; 428/42.3; 428/354; 428/906
[58] Field of Search .......................... 428/354, 40, 906, 428/41.9, 42.1, 42.3

[56] References Cited

U.S. PATENT DOCUMENTS

| | | |
|---|---|---|
| 3,857,731 | 12/1974 | Merrill, Jr. et al. . |
| 4,839,206 | 6/1989 | Waldenberger ........................ 428/354 |
| 4,844,973 | 7/1989 | Konishi ................................. 428/354 |
| 5,098,786 | 3/1992 | Hanke .................................... 428/354 |
| 5,130,185 | 7/1992 | Ness ...................................... 428/354 |
| 5,342,665 | 8/1994 | Krawitz ................................. 428/354 |
| 5,372,865 | 12/1994 | Arakawa ............................... 428/354 |
| 5,462,782 | 10/1995 | Su ......................................... 428/354 |

OTHER PUBLICATIONS

Myers, *Surfaces, Interfaces, and Colloids: Principles and Applications* (1991), pp. 8–15 and 405–415.
Adamson, *Physical Chemistry of Surfaces* (5th ed., 1990), 483–487.
Temin, Samuel T., "Pressure–Sensitive Adhesives for Tapes and Labels," in *Handbook of Adhesives*, ch. 38, pp. 641–663, (1990).

Primary Examiner—Jenna Davis
Attorney, Agent, or Firm—Brown, Martin, Haller & McClain

[57] ABSTRACT

A unique "double-sided" sheet product is described which is surfaced on two sides with releaseable adhesive, but which allows for differential releaseability from the surfaces to which it is attached, and is constructed such that the user is able to control completely which of the surfaces is to be preferentially detached from the product. A sheet of flexible material with two principal sides has adhesives attached to those sides for releaseable adherence of the sheet to two separate objects, with the sides having a different degrees of releaseability. The difference in releaseability can be obtained by either or both chemical or physical means, including adhesive composition, density, areal extent and positioning. The sheets may be in elongated tape form or more squarish or rectangular note form. Either or both adhesives may be formed as single bodies or a plurality of bodies on their respective sides of the sheet. The adhesives are preferably disposed in geometrical shapes, such as circles, ovals, ellipses, rectangles or polygons. The adhesives may be placed such that adhesive areas on adjacent sheets interfit and the sheets can be padded or stacked and the pads or stacks may be covered. Tapes may be rolled. The products permit making ordinary documents "self-posting" and can also be configured to provide for predictable differential releaseability.

38 Claims, 3 Drawing Sheets

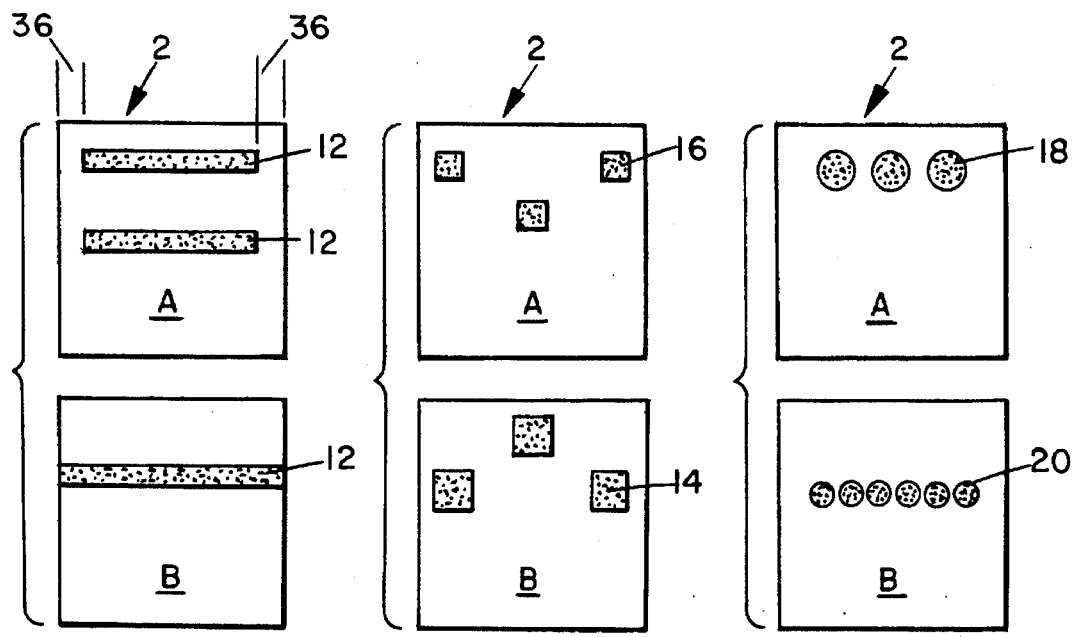
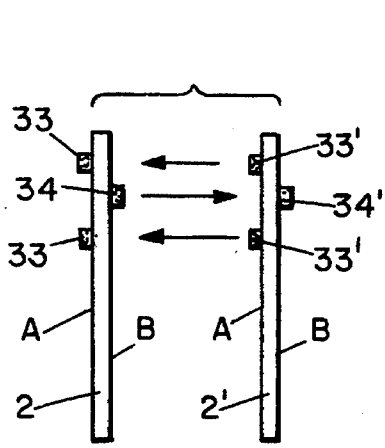
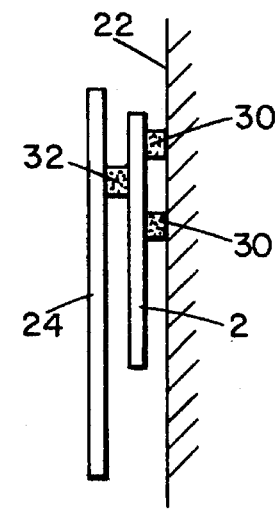
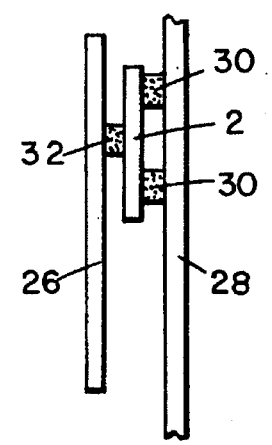
FIG. 5   FIG. 6   FIG. 7
FIG. 8   FIG. 9   FIG. 10
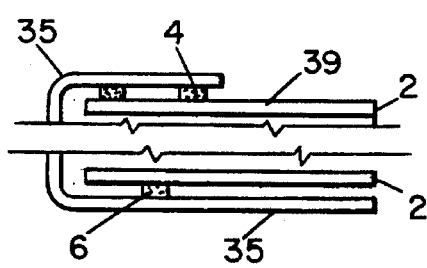
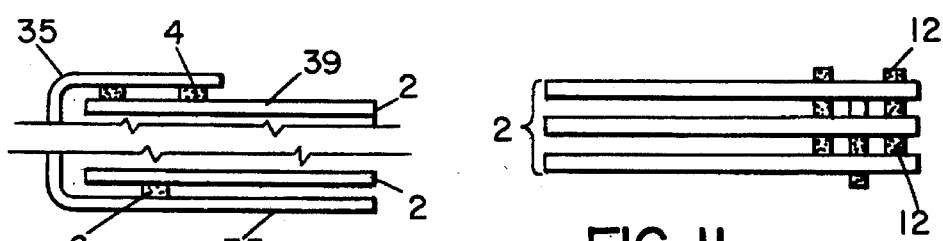
FIG. 12   FIG. 11

DOUBLE-SIDED RELEASEABLE ADHESIVE TAPE OR NOTE

CROSS-REFERENCE TO RELATED DOCUMENTS

The concept and many details of the present invention have previously been submitted to the Patent and Trademark Office and lodged as Disclosure Documents 332215 and 332398 on Jun. 3, 1993, and Jun. 10, 1993, respectively. Benefit of such lodgement is hereby claimed as defined in the announcement published in 883 P.T.O. Official Gazette 3 (Feb. 2, 1971).

BACKGROUND OF THE INVENTION

1. Field of the Invention

The invention herein relates to stationery and office supply products. More particularly it relates to note and tape products which adhere to surfaces by releaseable adhesives.

2. Description of the Prior Art

One of the most popular stationery or office supply products is the adhesive-backed paper sheet or "note." The adhesive is applied to one side of the note and has only a limited degree of tackiness or adhesiveness, so that the note can be attached to a substrate, typically a piece of paper or other smooth surface, and subsequently removed without damaging the paper, surface or other substrate to which it was attached. A number of different commercial vendors market products of this type in a variety of sizes, shapes and colors; typical examples are the products marketed by 3M Company under the trade name "Post-It". The note sheets are commonly sold in padded form, with the adhesive on the back of one sheet adhering to the adhesive-less face of the next sheet below it in the pad. The user then peels a single sheet or note off of the pad and sticks it to a sheet of paper or a surface as desired. However, while these note sheets are widely used and are very useful for many purposes, they have one major limitation: since they are "single-sided," they can only be used as single sheets. Their sole capability is to serve as a note or marker itself; they have no capability of being used in conjunction with more than a single substrate to which they may be attached.

(As used herein, the terms "single-sided" and "double-sided" will refer to the location(s) of adhesive on a note or sheet product, and thus to the producers capability for adherence to other surfaces. A "single-sided" product has adhesive only on one principal side, and therefore can adhere to only one other surface, while a "double-sided" product has adhesive on both principal sides and can adhere to two surfaces simultaneously.)

There have also been "double-sided" adhesive products, commonly tapes, available in the marketplace. These are normally formed as a length of clear film with single type of adhesive covering both sides. In essence they are nothing more than conventional clear "cellophane" tape but with adhesive on both sides instead of on only one side. The adhesives used are conventional non-releaseable tape adhesives, so they securely join the two substrates to which they are adhered and cannot be removed without damage to one or both of those substrates, especially where a substrate is a paper or painted surface.

Double-sided tape products have been marketed which are formed with a higher tack adhesive on one side and a lower tack adhesive on the other side. These have proved to be of very limited utility, however, for several reasons. Commonly the higher tack adhesive has been of only very limited releaseability and has had a tendency during separation attempts to tear or otherwise damage the substrate from which it is being separated, especially if that substrate is a relatively fragile material such as paper and one tries to perform the separation reasonably quickly. Also, since the tapes and both adhesives are normally clear, there is no way to differentiate the two sides visually, so that users have great difficulty adhering the tape to the respective substrates properly. Finally, for such tapes to be rolled, one must use a separation sheet between each layer to prevent the two adhesives from contacting each other, which is both inconvenient for the user and creates a substantial amount of waste material which must be disposed of.

There are no known commercial releaseable double-sided notes, tapes or sheets, especially ones which can be obtained in padded or rolled form without divider sheets. Conventional double-sided tapes are not releaseable, and therefore cannot be used for creating double-sided notes as by attaching them to bare sheets of paper. Further, simply double-siding conventional single-sided releaseable notes and tapes does not produce a useful product, since two conventional adhesive bonds formed with two opposing surfaces will not separate in a predictable manner. Since the adhesives are aligned and alike on both sides, one attempting to peel apart two surfaces joined by a double-sided product would find that half the time the double-sided joining product would, separate from one sheet's surface and half the time from the other. In addition, if such double-sided notes are stacked upon one another, contact between the adhesive of the note above and that of the note below increases the amount of force required to separate the notes, causing unwanted paper curl and reduced ease of use.

SUMMARY OF THE INVENTION

The present invention provides a unique "double-sided" sheet product which is surfaced on two sides with releaseable adhesive, but which allows for easily releaseable separation from the surfaces to which it is attached, and is constructed such that the user is able to control completely which of the surfaces is to be preferentially detached from the product. The sheet product can be in the form of a note or tape.

In its principal embodiment, the invention is a sheet product which comprises a sheet of flexible material having a first side and an opposite second side; a first adhesive attached to a portion of the first side and presenting an exposed area of the first adhesive for releaseable adherence of the sheet product to a first object; a second adhesive attached to a portion of the second side and presenting an exposed area of the second adhesive for releaseable adherence of the sheet product to a second object; and the exposed area of the first adhesive having a different degree of releaseability than the exposed area of the second adhesive.

The differential releaseability can be obtained by either or both chemical or physical means. In some embodiments the first adhesive is formed of one chemical composition and the second adhesive is formed of a different chemical composition, and the difference in degree of releaseable adhesiveness arises from the chemical compositions having different adhesive properties. In other embodiments the adhesives are formed of the same chemical composition, and the differential releaseability or adhesiveness arises from the exposed area of the first adhesive having a different areal expanse, position or density than the exposed area of the second adhesive.

The adhesives can be oriented such that, when the double-sided products of this invention are positioned between and adhered to two different substrates, the direction from which a separating or peeling force is applied determines which side of the product will be reliably and repeatedly separated from the substrate to which it is adhered in preference to separation of the other side of the product from the substrate to which it is adhered. Further, the adhesive orientation can be such that different preferential separation of the two sides from their respective substrates will be determined by the specific direction from which the force is applied.

Either or both adhesives may be formed as single bodies or a plurality of bodies on their respective sides of the sheet. Thus either or both adhesives may be disposed in a plurality of non-contiguous locations on their respective sides of the sheet material, thus presenting a plurality of separate areas of exposure of the adhesive for adhesion to the first or second objects respectively. The adhesive bodies are preferably disposed in geometrical shapes, such as circles, ovals, ellipses, strips, rectangles or polygons.

In preferred embodiments the adhesives on the sheets are located such that adhesive areas on adjacent sheets interfit and the sheets can be padded or stacked. In such a pad the sheets may be aligned or rotated at different angles to each other, depending on the layout of the adhesives.

Also included as embodiments of the invention are padded notes and rolled tapes.

BRIEF DESCRIPTION OF THE DRAWINGS

FIGS. 1A, 1B and 1C, is an elevation view showing both sides and the end of a tape product, illustrating one version of differential adhesive application of the present invention.

FIGS. 5, 6 and 7 are plan views of both sides of a note product of this invention, illustrating additional versions of differential adhesive application.

FIG. 8 is a side elevation view, showing a typical example of how multiple notes of the present invention interfit when padded together.

FIGS. 9 and 10 are side elevation views showing use of a note or tape product of this invention to secure a piece of paper to, respectively, a surface of a large object and another piece of paper.

FIG. 11 is a side elevation view showing a form of typical padding of note sheets of this invention, aligned with the same orientation.

FIG. 12 is a side elevation view showing padded notes of this invention with a releaseable cover which spans both sides or faces of the notes.

FIGS. 13A, 13B and 13C, is an elevation view showing both sides and the end of a note product, illustrating yet another version of differential adhesive application of the present invention.

FIGS. 15A, 15B and 15C, is an elevation view showing both sides and the end of a note product, illustrating yet another version of differential adhesive application of the present invention.

FIGS. 16A and 16B, is a diagrammatic view illustrating the mechanical principle related to preferential separation responsive to the direction from which a separating force is applied.

DETAILED DESCRIPTION AND PREFERRED EMBODIMENTS

The product of this invention is best understood by reference to the drawings. The products herein will be referred to collectively by the term "sheet," and it will be understood that any thin, flexible sheet-like page, strip, leaf, lamina or similar object is to be considered to be equivalent for the purposes of this invention. Because there will be shape, packaging and marketing distinctions, various embodiments of the "sheets" may be further defined as "notes" or "tapes." To the extent that such distinction may be significant, a "tape" can be considered to be more elongated than a "note," and typically will tend to have the adhesive areas extending to both edges of at least one of its sides, whereas a "note" will have more of a squarish or rectangular shape and will typically have the adhesive areas concentrated at or near one edge, with larger areas of surface without applied adhesive. "Notes" will usually be packaged in padded form, while "tapes" will be packaged in rolled form.

Figure 1:
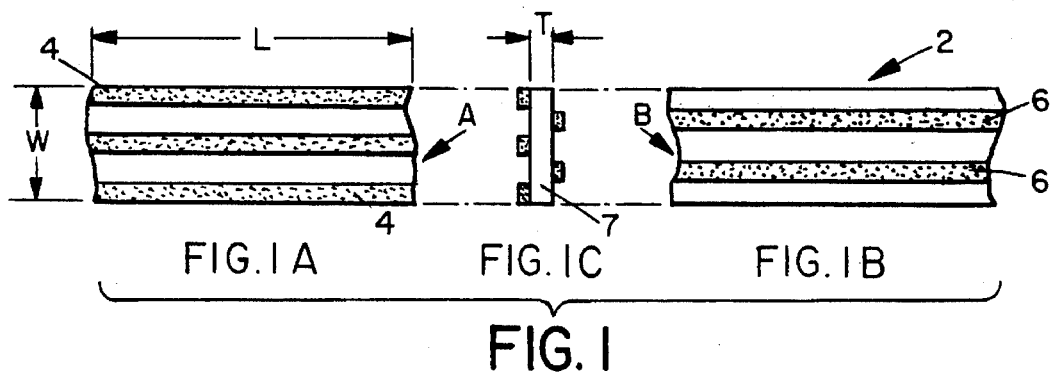
FIG. 1, divided into
Figure 2:
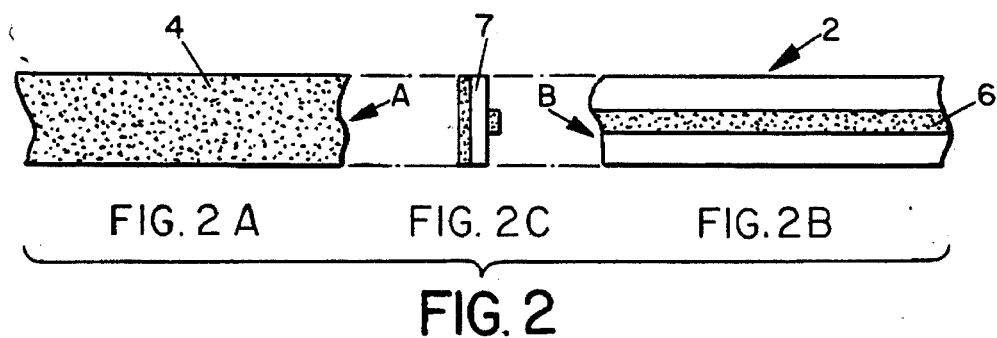
FIGS. 2 and 3 are similar to FIG. 1, illustrating alternative versions of differential adhesive application for tape products of this invention.
Figure 3:
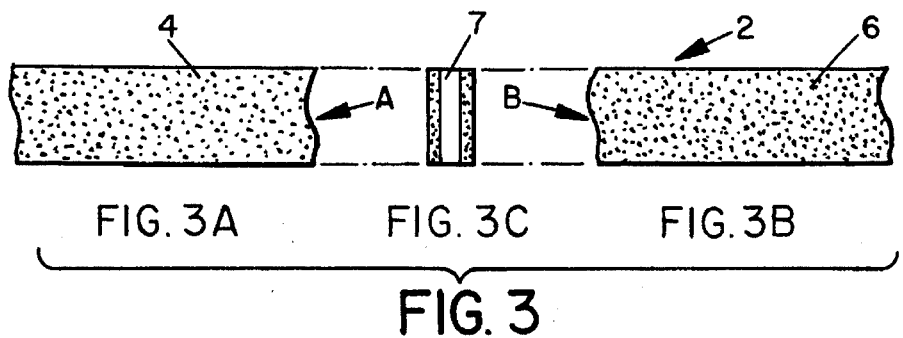

FIGS. 1, 2 and 3 show a tape 2 as seen from opposite sides (FIGS. 1A, 2A and 3A, and 1B, 2B and 3B, respectively) and also from the end (FIGS. 1C, 2C and 3C). Either side may be designated the "front" of the tape 2 with the other thus becoming the "rear" or "back"; normally the particular designation is not significant. (In some Figures the sides will be designated "A" and "B" for convenience in understanding the invention.) Each sheet has a width W, a length L and a thickness T. As with all sheet materials, such as sheets of paper, the thickness T is small compared to the width W and length L. For instance, common paper thicknesses are on the order of 0.002–0.005 in (0.05–0.013 mm); see Blair, *The Lithographers Manual*, p. 13–38 (7th edn.; Graphic Arts Technical Foundation: 1983). Thus any edge 7 area will be less than ½% of a side area and can be disregarded as being a "surface" or "side" for the purpose of this invention.

For notes the dimensions W and T will be generally similar, while for tapes the dimension L will be much greater than the dimension W. The overall dimensions of the present sheet product in its various versions will be similar to those of prior art tapes, notes and sheet products. In typical note configurations the L and W dimensions can be from about 1 in (25 mm) upward; a typical L and/or W dimension can be 3–12 in (75–300 mm) or more. Common sizes will be 1×2 in (25×50 mm) and 2×2¾ in (50×70 mm). The latter size is particularly useful for unobtrusive adherence of common size business cards or checks. The limiting factors will be minimum dimensions that allow sufficient surface to have both adhesive and a gripping or writing area on each side and maximum dimensions that form a sheet too heavy to be adhered in position by a reasonable amount of adhesive. Typical tape dimensions will be W of ¼–4 in (6.3–102 mm) and an L of any desired length; a typical dimension L (in rolled form) is 36 yds (32 m), but larger or small rolls are also common.

On a portion of each of the sides of tape 2 are bodies of adhesive designated respectively 4 (on side A) and 6 (on side B). It is critical to the present invention that the sides A and B exhibit different degrees or patterns of releaseability. Such differences manifest themselves when the product 2 is adhered to two different substrates (as will be discussed below). A difference in the degree of releaseability occurs when one of the sides A and B adheres more strongly to its substrate than does the other. A difference in the pattern of releaseability occurs when the relative positions or other characteristics of the adhesives on sides A and B cause one side to predictably release its substrate before the other, or to release it predictably under different physical conditions than the other.

This differential releaseability can be obtained either physically or chemically. Both physical and chemical embodiments are illustrated in the drawings. In physical systems, such as those shown in FIGS. 1, 2 and 4, the differential releaseability may be obtained by having a greater projected surface area for the adhesive on one side of the tape or note 2 than for the adhesive on the other side. For instance, in FIG. 1 a single type of adhesive is used on both sides, and the adhesive 4 covers a greater percentage of the surface area of side A and therefore has a greater projected area for adhesiveness than the comparable projected area of adhesive 6 on side B, such that side B will be more releaseable than side A. Similarly, in FIG. 2, the adhesive 4 completely covers side A, while adhesive 6 covers only a limited portion of side B, such that where the adhesive compositions are the same, side B will be more releaseable. The same is true of the note example shown in FIG. 4.

Figure 13:
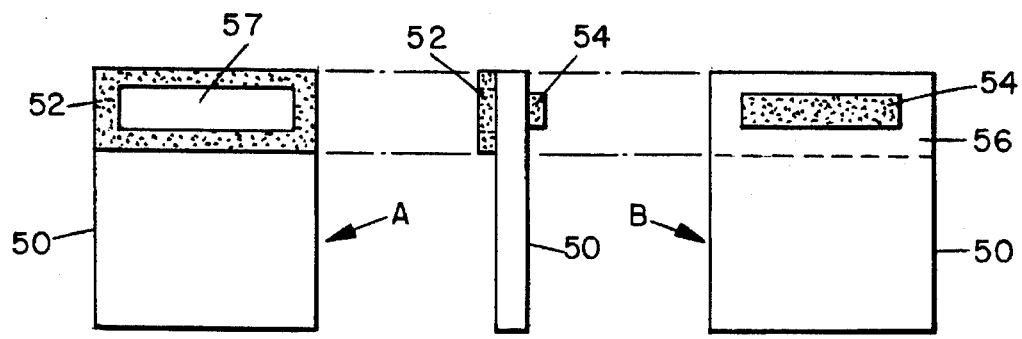
FIG. 13 divided into
Figure 15:
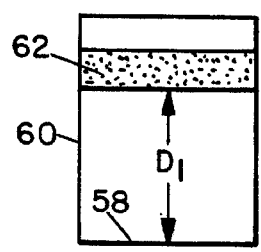
FIG. 15 divided into
Figure 15:
Figure 15:
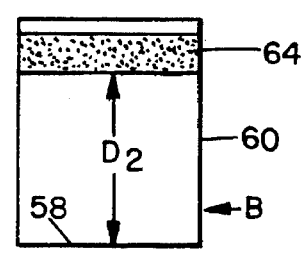

Other suitable means of obtaining differential physical releaseability are illustrated in FIGS. 5, 6, 7, 13 and 15. FIG. 5 shows strips 12 of adhesive, all of which are the same size, but there are a greater number of strips 12 on side A of the note 2 than there are on side B, so the total cumulative area on side A is greater. In FIG. 6 the adhesives are arranged as a plurality of squares. Each side has the same number of squares but the squares 14 on side B are larger than the squares 16 on side A, so the total cumulative area on side B is greater. In FIG. 7 both the number and size of the adhesive bodies (here shown as circles 18 and 20), are different. It will be recognized that a wide variety of different adhesive patterns, shapes and numbers of bodies can be used. It will also be recognized that for a single sheet 2 there is no significance as to which side of the sheet 2 has the larger cumulative area of adhesive. In FIGS. 13 and 15 the adhesives are illustrated as of the same composition. In FIG. 13 the areas of the two adhesives are different and they are positioned such that the area of adhesive 54 lies entirely within the bounds of area 56 of the more extensive adhesive 52 as projected through the sheet 50. In FIG. 15 the adhesives 62 and 64 are illustrated as being of the same composition and areal extent, but adhesive 62 is positioned on side A of sheet 60 such that it extends closer to edge 58 of sheet 60 than does adhesive 64 on side B of sheet 60; i.e., that the dimension $D_1$ is less than dimension $D_2$. The two configurations of FIGS. 13 and 15 are particularly useful when it is desired to have the differential releaseability be predictably responsive to the direction from which a separating or peeling force is applied, as will be discussed below in conjunction with FIG. 16.

Differential releaseability may be obtained by chemical means by using two different adhesive compositions with different degrees of chemical adhesiveness or tackiness and therefore releaseability, with one adhesive composition placed on one side of the note 2 and the other adhesive composition placed on the other side. (This is illustrated graphically in FIG. 3, with the different densities of stippling indicating different chemical compositions.) In this case, the projected areas of adhesion on the two sides A and B may be equal, such as by having the same extent of adhesive coating on both sides of the tape 2 in FIG. 3. In another embodiment, the same adhesive composition may be used, but the portion of adhesive for one side may be diluted with solvent or filler, so that there is a lesser concentration of the tack-producing compound present in that adhesive body than in the other, resulting in the former having greater releaseability than the latter. Another alternative is to have, after application of the adhesives, one of the adhesive bodies washed or reacted with a tack-reducing substance, such as a thin film or dust layer, so that the treated body has less tack and therefore greater releaseability than the untreated body. Other possible alternatives will readily suggest themselves to those skilled in the art. Of course any of these methods may be used in combination. It will be necessary, however, that the various chemical means do not act to reduce tack to the point where the sheet products do not adhere adequately.

It is also possible to combine both chemical and physical differential releaseability by using two different adhesive compositions disposed in different physical forms to project different areas of adhesion (in any of the configurations shown).

A number of adhesives may be used in this invention. Primarily they will be the limited-adhesiveness materials commonly used in the prior art releaseable single-sided notes. However, other limited-adhesiveness materials which may be currently available or which may be developed in the future are also intended to be within the scope of this invention. See, e.g., Temin, "Pressure-Sensitive Adhesives for Tapes and Labels" in Skeist, *Handbook of Adhesives* (3rd edn., Van Nostrand Reinhold: 1990), ch. 38; and Considine (ed.), *Scientific Encyclopedia* (7th edn., Van Nostrand Reinhold: 1989), vol.1, page 39.

The desired degree of releaseability will be a matter of choice. An important element will be the ability of the adhesives to allow the sheet products to be easily and rapidly separated from the other substrates (especially fragile substrates such as paper) without damage to the sheet product or the substrate. Rapidity of clean separation is significant; there are some adhesives which can sometimes be separated from a fragile substrate if done very slowly and carefully. These, however, are not useful in the present invention because of the difficulty of obtaining clean and repeatable separation easily. As noted, adhesives such as those used for the prior art single-sided products have an appropriate degree of releaseability, and can be used as a general standard; a typical example will be found in U.S. Pat. No. 3,857,731. The adhesives for the present product can then be compounded and/or applied to produce degrees of releaseability which are different from each other but still generally similar to the prior art adhesives. Alternatively, or in combination, one can determine a numerical value for the degree of adhesiveness (and therefore releaseability) of prior art adhesives such as those described in the aforesaid U.S. Patent using one or more of the various test devices and methods described in the aforesaid Temin reference. Using this value as a standard, one can then compound and/or apply adhesives for the present invention having generally comparable values as similarly measured.

It will be recognized that the configurations shown in the Figures are exemplary and typical, and that many other configurations are possible and useful. The specific degree of adhesiveness, tackiness and releaseability on either side of a note, tape or sheet of this invention, in any configuration, can easily be determined by use of conventional adhesiveness measuring devices. Such measurements are particularly useful where physical and chemical means are used together, or where there are a number of differently shaped adhesive areas, such that visual observation of the sheet may not allow adequate identification of which side of the sheet has the greater releaseability.

The differential releaseability of the adhesives on opposite sides of the note 2 provides for constant and reproducible differential separation of the note 2 of the present invention from the two substrates to which it is attached. This is best illustrated in FIGS. 9 and 10. In FIG. 9 the note 2 is shown as adhered to a large substrate 22 and also to a sheet substrate 24. Typically, substrate 22 would be a smooth wall surface, a bulletin board, the front of a refrigerator in one's home, and so forth. Sheet substrate 24 could be a sheet of paper such as a memo, notice, picture, list or other document which one desired to post temporarily on the large substrate 22. The note 2 is adhered to the substrate 22 on the side with the larger quantity of adhesive as shown by the two strips of adhesive 30. The smaller area of adhesive then projects outwardly from the substrate 22 as illustrated by the single strip of adhesive 32. To this smaller area of adhesive 32 is attached the second substrate, sheet 24. When the information on the sheet 24 is no longer needed or it is desired to change the announcement, picture, etc., one merely peels off the sheet 24 from its attachment to the single adhesive 32. Because the stronger adhesive (i.e., the two strips 30) is attached to the underlying substrate 22, the removal of the sheet 24 does not affect the adhesion of the note 2 to the substrate 22, and the note 2 remains in place on substrate 22 to be used as an attachment point for another document to replace sheet 24. This can be done repeatedly.

Considering FIG. 10, the same principle as in FIG. 9 is shown. The embodiment of FIG. 10 represents the use of the double-sided tape 2 to attach one sheet substrate 26, such as a piece of paper, to another underlying substrate 28 through the tape 2, while retaining the ability to preferentially remove the first substrate 26 from the underlying substrate 28 without also separating the tape 2 from the underlying substrate 28. This would be useful, for instance, where in FIG. 10 the sheet 28 is a letter or invoice regarding payment of a bill and the sheet 26 is a check for the amount being paid. The check 26 can then easily be removed without taking with it the attaching tape 2 so that the check can be processed through automated equipment while the letter or invoice 28 is dealt with separately.

The principles illustrated in FIGS. 9 and 10 are also relevant to another important characteristic of the present invention, the ability to make an ordinary document or other item "self-posting." For instance, assume in FIG. 10 that substrate 28 is a business card. By adhering note 2 to the back of card 28 with the adhesive 30, which is less releaseable than adhesive 32, the card 28 can be repeatedly and sequentially adhered to and removed from various substrates 26, such as letters, files, etc., taking advantage of the greater degree of releaseability of the adhesive 32. In like manner a check 28 could be made self-posting and be sequentially attached to an invoice, a ledger page, etc. In both cases the check, card or other item 28 remains attached to sheet 2 for as long as desired, and when it is not longer desired for the item 28 to be "self-posting," the sheet 2 can be readily removed without leaving an adhesive residue or harming item 28.

In preferred embodiments of the present invention the adhesives are disposed so that the sheets 2 can be stacked or padded and then easily separated with their adhesives intact. That can be accomplished by the configurations shown in FIGS. 8, 11 and 12. By placing the adhesives, such as 12, on the opposite sides A and B in nonaligned and noncorresponding positions, the adjacent notes 2 can be readily stacked and padded without interference with each other. Thus, as seen in FIG. 8, nonaligned strips of adhesive 33 and 34 are placed on their respective sides of note 2 so that as the note 2 is aligned with an adjacent note (designated 2') with corresponding strips 33' and 34', the opposed strips interfit and the outer surface of each strip of adhesive touches only the paper surface of the adjacent note, so that the notes can be readily separated with their respective adhesive strips intact.

A pad of a plurality of notes 2 with opposed strips interfitted is shown in more detail in FIG. 11. This configuration can of course be extended to typical pad thicknesses of 50–100 sheets or more as desired. At the bottom of the pad will commonly be a release sheet (not shown) having no adhesive of its own and from which the bottom double-sided note can be readily separated. Such release sheets at the bottom of padded single-sided notes are conventional and the same types of release sheets can be used in this invention.

FIG. 12 illustrates an embodiment in which a pad of notes 2 is fitted with a cover 35, which spans at least across the exposed adhesive bodies 4 and 6 of the outermost notes 2 in the pad. The inner surface of the cover 35, which itself has no adhesive, thus serves as a release sheet for the padded notes 2. The cover 35 may span all the way over the top and bottom of the pad, thus providing means to keep the padded notes clean until use and also to prevent the padded notes from sticking to adjacent objects when the pads are stored in a desk or on a storage shelf. Preferably, however, as shown in FIG. 12, the top of the cover 35 is shortened and ends at edge 37, exposing the lower non-adhesive portion 39 of the top note 2, so that the top note 2 can be easily grasped and pulled free of the pad. The edge 37 should be spaced past the closest adhesive 4, as shown, so that the portion of the cover 35 adjacent edge 37 can be grasped and pulled back to expose an appropriate amount of the top note 2.

Figure 14:
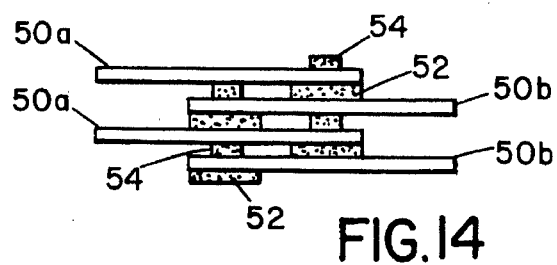
FIG. 14 is a side elevation view showing the product of FIG. 13 in the form of a pad of note sheets, aligned with repeating opposite orientation.

FIG. 14 illustrates an embodiment of the invention in which sheets 50 having adhesives 52 and 54, which would otherwise contact each other when padded, can be padded without such unwanted contact. Two pairs of pluralities of sheets 50 (designated 50a and 50b) are padded and interfitted in alternating directions and with extensive overlap, so that the adhesives 52 and 54 are in alternate positions for sequential sheets 50a and 50b and the opposite distal ends of the sheets 50a and 50b are rotated 180° with respect to each other. Sufficient extents of the free distal ends of the sheets are left so that the user can easily grasp individual sheets to separate and use them. Other rotations, such as three pluralities of sheets mutually at 120° to each other, can also be obtained by appropriate positioning of the adhesives.

It is convenient for the various notes 2 in a pad to be colored. An entire pad may have all the same color of notes, or there can be a plurality of colors for the successive notes. This latter arrangement with pluralities of colors is particularly adaptable to the embodiment shown in FIG. 14, where the notes 50a would conveniently be a different color than the notes 50b. It is also contemplated that in many cases the sheets will be decorated by various types of printing, labeling, pictures, cartoons or the like as is common with the single-sided sheets presently available commercially. Coloring, labelling and the like can have functional significance. For example, shading the stronger and weaker adhesives of a note to distinguish them visually from each other and from non-adhesive areas of the note helps the user quickly choose the correct orientation of the note for the desired relative attachments to the different substrates.

Figure 16:
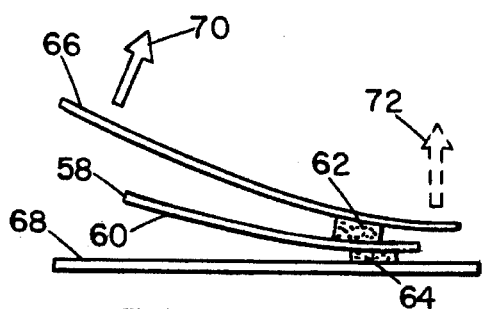
FIG. 16 divided into
Figure 16:
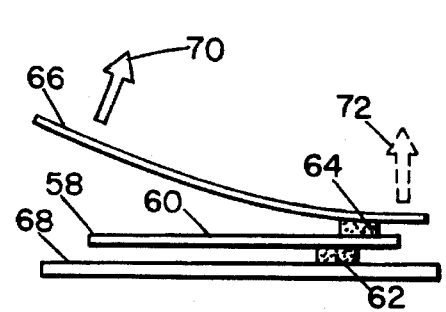

Both FIGS. 13 and 15 illustrate products of this invention which can be constructed to provide for predictable differential separation or releaseability based on adhesive positioning when used to join two substrates, as discussed briefly above. FIG. 16 illustrates graphically the principle involved. In FIG. 16A a sheet 60 as illustrated in FIG. 15 is shown as adhered to two substrates 66 and 68 by adhesives 62 and 64 respectively, which adhesives have the same compositions, and, in the example shown, have the same shape and extent of adhesive surface area. It can be demonstrated that where a separating or peeling force 70 is applied to one of the substrates (in this case 66) from the direction of the edge 58 of sheet 60, the adhesive which is farthest from the edge 58 (in this case adhesive 64) will be the one which preferentially is separated from its substrate. By "farthest" is meant that least some portion of the other adhesive (here adhesive 62) lies closer to the edge 58, even though the adhesive areas may overlap to some extent. This effect is believed to be based on the adhesive closer to the force 70 (here adhesive 62) acting as a lever to exert a stronger separating force between adhesive 64 and substrate 68 than is imposed between adhesive 62 and substrate 66. Therefore, sheet 60 is preferentially and predictably separated from substrate 68 and remains adhered to substrate 66. FIG. 16B shows how the principle is used to shift the preferential separation. The note 60 is turned over before being used to adhere substrates 66 and 68, so that adhesive 64 (the farther adhesive) is now adhered to substrate 66, so that substrate 66 is preferentially separated from sheet 60 by force 70. Further, if the force 70 is applied to a different edge than edge 58, as indicated by the phantom arrows 72, the effect reverses, since adhesive 62 is now the farther adhesive in each case and the substrates to which it is adhered are where the preferential separation takes place. Thus by relative positioning of the adhesives 62 and 64, the preferential separation or releaseability can be made responsive to the direction from which the force 70 is applied.

The same positioning principle works with the sheet embodiment of FIG. 13, which can be used when the preferential releaseability is to remain the same no matter which direction the force 70 comes from. Since at all points the perimeter of adhesive 52 lies closer to the edges of the sheet 50 than those of adhesive 54, notwithstanding the open non-adhesive area 57 within the expanse of adhesive 52, the adhesive 54 will always be the one which will be separated preferentially from its substrate, even though it may actually contain a somewhat greater quantity of adhesive. Of course, it will be understood that other properties, such as the actual overall areal extent of each adhesive and whether they are of the same or different compositions, will have an effect on preferential separation or releaseability. The person skilled in the art will have no difficulty assessing the different factors for any given product and determining adhesive type, extent and position for the particular effect desired.

Figure 4:
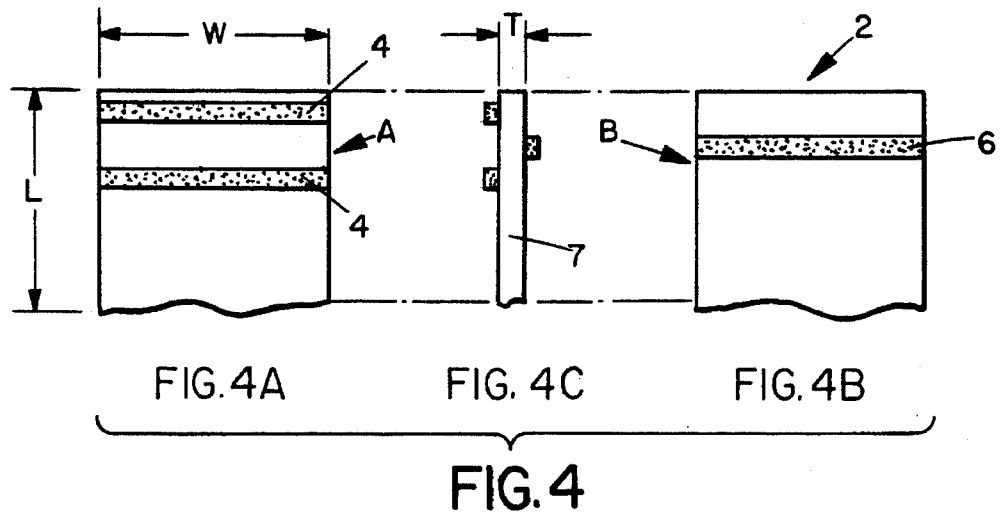
FIG. 4 is also similar to FIG. 1, but illustrates differential adhesive application to a note product of this invention.

One may also increase the ease of separation of the outer sheets 24 or 26 from the note 2 as illustrated in FIGS. 9 and 10 by an arrangement of adhesive at least on the side facing the sheet 24 or 26 which does not to extend completely to the edges of the width W of the note 2 (FIG. 4). Thus, in FIG. 5 are shown margins 36 between the ends of the adhesive strips and the edges of the note 2. This facilitates removal of the sheet 24 or 26 because it leaves an edge free to be easily gripped so that the sheet can be readily removed from that side of the sheet 2. The same type of margin is evident in FIGS. 6 and 7 where the other shapes (in this case squares and circles) do not extend to the edge of the sheet 2. It will be noted that in FIG. 5 the adhesive strip on Side B does not have such a margin 36, which increases the differential releaseability between sides A and B, but if desired such margins could be used with the adhesive on side B also.

The materials which form the sheets of this invention may be any light, flexible materials. Such materials will usually be cellulosic or polymeric, will not have any inherent tackiness of their own, and will be such that the adhesives will adhere properly to them. The most preferred material, at least for notes, will be paper, while the usual tape bases will be vinyl film, cellophane or the like. Other materials such as light cardboard, Bristol board, and other polymeric films will also be useful. The degree of flexibility will be dependent upon the nature of the product and its intended end use; usually notes will have less flexibility than tapes.

It will be evident from the above that there are numerous embodiments of the present invention which, while not expressly described above, are clearly within the scope and spirit of the invention. Therefore, the above description is intended to be exemplary only and the invention is to be limited solely by the appended claims.

I claim:

1. A sheet product which comprises:
   a sheet of flexible material having a first side and an opposite second side;
   a first adhesive attached to a portion of said first side and presenting an exposed area of said first adhesive for releaseable adherence of said sheet product to a first object;
   a second adhesive attached to a portion of said second side and presenting an exposed area of said second adhesive for releaseable adherence of said sheet product to a second object;
   at least one of said adhesives being applied to its respective side of said sheet in a manner such that a substantial area of said respective side of said sheet is free of adhesive; and
   said exposed area of said first adhesive having different releaseability than said exposed area of said second adhesive.

2. A sheet product as in claim 1 wherein said flexible material is a cellulosic or polymeric material.

3. A sheet product as in claim 2 wherein said material is paper.

4. A sheet product as in claim 1 wherein said difference in releaseability is obtained through chemical means.

5. A sheet product as in claim 4 wherein said first adhesive is formed of a first chemical composition and said second adhesive is formed of a second chemical composition, and said differential releaseability arises from said chemical compositions having different adhesive properties.

6. A sheet product as in claim 4 wherein said first adhesive contains a diluent or filler which is not present or which is present in a different quantity in said second adhesive, and said differential releaseability arises from said diluent or filler imparting adhesive properties to said first compositions which are different from adhesive properties of said second adhesive.

7. A sheet product as in claim 4 wherein said first and second adhesives on their respective sides of said sheet material are disposed such that they are not directly opposite each other as projected through said sheet material.

8. A sheet product as in claim 1 wherein said difference in releaseability is obtained through physical means.

9. A sheet product as in claim 8 wherein said first adhesive and said second adhesive are formed of chemical compositions having equivalent adhesive properties, and said differential releaseability arises from said exposed area of said first adhesive having a different expanse than said exposed area of said second adhesive.

10. A sheet product as in claim 9 wherein expanses of said exposed areas of said first and second adhesives on their respective sides of said sheet material are disposed such that they are not directly opposite each other as projected through said sheet material.

11. A sheet product as in claim 8 wherein said physical means comprises relative placement of said adhesives on said sheet material.

12. A sheet product as in claim 11 wherein said sheet material has an edge and at least a portion of one of said adhesives is spaced closer to said edge than any portion of the other of said adhesives.

13. A sheet product as in claim 1 wherein differential releaseability is obtained through a combination of chemical and physical means.

14. A sheet product as in claim 1 wherein said first adhesive is formed of a first chemical composition and said second adhesive is formed of a second chemical composition, said exposed area of said first adhesive has a different expanse than said exposed area of said second adhesive, and said differential releaseability arises both from said chemical compositions having different adhesive properties and from said difference in expanse of said areas of exposure.

15. A sheet product as in claim 14 wherein said expanses of said exposed areas of said first and second adhesives on their respective sides of said sheet material are disposed such that they are not directly opposite each other as projected through said sheet material.

16. A sheet product as in claim 1 in the form of a tape.

17. A sheet product as in claim 16 wherein said tape is rolled.

18. A sheet product as in claim 1 in the form of a note.

19. A sheet product as in claim 18 wherein said note has a generally squarish or rectangular form.

20. A sheet product as in claim 1 wherein each of said first adhesive and said second adhesive is disposed such that its exposed area is in the form of a geometrical shape on its respective side of said sheet material.

21. A sheet product as in claim 20 wherein said geometrical shape is a circle, oval, ellipse, rectangle or polygon.

22. A sheet product as in claim 1 wherein separate quantities of at least one of said first and second adhesives are disposed in a plurality of non-contiguous locations on the respective sides of said sheet material, thereby presenting a plurality of separate areas of exposure of said adhesive for adhesion to said first or second objects respectively.

23. A sheet product as in claim 22 wherein said first adhesive and said second adhesive are formed of the same chemical composition, and differential releaseability arises from said separate quantities of one of said adhesives presenting a different cumulative expanse of exposed area than said separate quantities of the other adhesive.

24. A sheet product as in claim 23 wherein said expanses of said exposed areas of said first and second adhesives on their respective sides of said sheet material are disposed such that they are not directly opposite each other as projected through said sheet material.

25. A pad comprising a plurality of said sheet products of claim 1 aligned and adhered together.

26. A pad as in claim 25 wherein all of said sheet products are aligned in identical orientation.

27. A pad as in claim 25 wherein a first portion of said plurality of sheet products are aligned with a different orientation than that of a second portion of said plurality of sheet products.

28. A pad as in claim 27 wherein said the respective alignments of said first and second portions differs by 180°.

29. A pad as in claim 25 also comprising a cover spanning at least exposed adhesive areas of sheets on extremities of said pad.

30. A sheet product as in claim 1 further comprising said sheet of flexible material having at least a first edge and said first and second adhesives being positioned on opposite sides of said sheet material and oriented with respect to each other such that application of force from the direction of said first edge will result in the predictable separation of one of said adhesives from a substrate to which it is attached in preference to separation of the other of said adhesives from a substrate to which it is attached.

31. A sheet product as in claim 30 wherein said two adhesives are oriented relative to each other such that said adhesive which is to be preferentially separated by said force is positioned with all portions thereof spaced farther from said first edge than at least one portion of said other adhesive.

32. A sheet product as in claim 30 further comprising at least a second edge and wherein said first and second adhesives are oriented with respect to each other such that application of said force from the direction of said first edge will result in the predictable separation of said first adhesive from a substrate to which it is attached in preference to separation of said second adhesive from a substrate to which it is attached, and application of said force from the direction of said second edge will result in the predictable separation of said second adhesive from a substrate to which it is attached in preference to separation of said first adhesive from a substrate to which it is attached.

33. A sheet product as in claim 32 wherein said first and second adhesives are oriented relative to each other such that each adhesive which is to be preferentially separated by one of said applications of force is positioned with all portions thereof spaced farther from said edge from whose direction said force is to be applied than at least one portion of the other of said adhesives.

34. A product comprising a document adhered to a sheet product as in claim 1 whereby said document thereupon becomes adapted for adherence to a substrate.

35. A product as in claim 34 wherein said document comprises a check or a business card.

36. A product comprising two substrates adhered to one another through a sheet product of claim 1.

37. A product as in claim 36 wherein one of said substrates is a rigid vertical surface and the other is a flexible sheet material.

38. A product as in claim 36 wherein both of said substrates are flexible sheet materials.

* * * * *